J. C. ELLIOTT.
Cultivators.

No. 152,834. Patented July 7, 1874.

UNITED STATES PATENT OFFICE.

JUNIOUS C. ELLIOTT, OF SIMPSON COUNTY, KENTUCKY.

IMPROVEMENT IN CULTIVATORS.

Specification forming part of Letters Patent No. 152,834, dated July 7, 1874; application filed May 12, 1874.

*To all whom it may concern:*

Be it known that I, JUNIOUS C. ELLIOTT, of the county of Simpson and State of Kentucky, have invented certain new and useful Improvements in Cultivators; and I do hereby declare that the following is a full, clear, and exact description thereof, reference being had to the accompanying drawings, and to the letters of reference marked thereon, which form a part of this specification.

The nature of my invention consists in the construction and arrangement of a revolving harrow or cultivator, as will be hereinafter more fully set forth.

In order to enable others skilled in the art to which my invention appertains to make and use the same, I will now proceed to describe its construction and operation, referring to the annexed drawing, in which—

Figure 1:
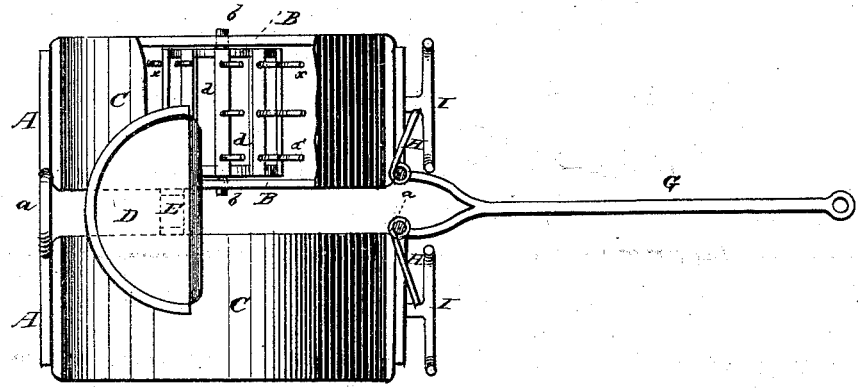
Figure 2:
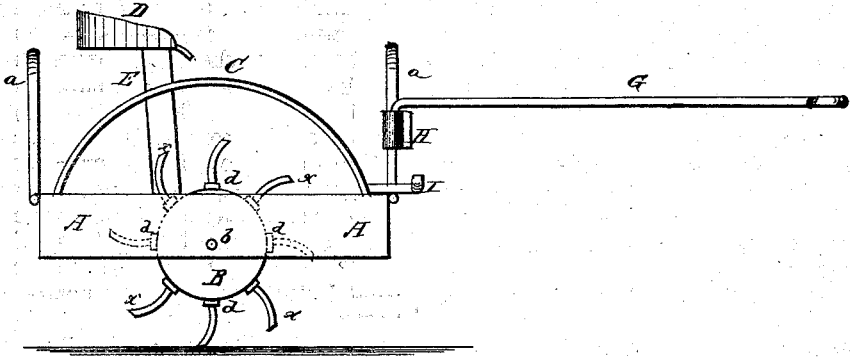

Figure 1 is a plan view, and Fig. 2 a side elevation.

A A represent two rectangular frames of any suitable dimensions, connected at both ends by means of arched rods $a\ a$, so as to be parallel with each other, and a suitable distance apart. In the center of each frame A is a horizontal cross-shaft, $b$, upon which the revolving harrow is placed, such harrow consisting of two circular heads, B B, connected by means of slats or bars $d\ d$, from each of which project a series of curved teeth, $x\ x$. The harrow thus constructed revolves upon the shaft $b$, and, there being two such harrows placed end to end, both sides of a row may thus be cultivated at the same time. The harrows are covered on top by curved or arched housings C C, secured to the ends of the frames A A, for the purpose of protecting the driver, who is seated upon the seat D above said housings, said seat being supported upon two standards, E E, attached to the inner sides of the frames. G represents the tongue, which is attached to the front connecting-rod $a$, and to which rod are also attached foot-rests H H for the driver. The whiffletrees I I are attached to the front ends of the frames A A.

The double cultivator or harrow thus constructed is simple in construction and easily made, hence cheap to manufacture. It is durable, and not liable to get out of order.

Having thus fully described my invention, what I claim as new, and desire to secure by Letters Patent, is—

The combination of parallel frames A, revolving harrows B $d\ x$, connecting arch-rods $a$, and casing C, all constructed and operating as and for the purpose set forth.

In testimony that I claim the foregoing as my own I affix my signature in presence of two witnesses.

JUNIOUS C. ELLIOTT.

Witnesses:
 J. S. PROCTER,
 A. J. SAMUEL.